(12) United States Patent
Wu et al.

(10) Patent No.: US 12,030,801 B2
(45) Date of Patent: Jul. 9, 2024

(54) SALINE WASTEWATER TREATMENT SYSTEM USING SOLAR-ASSISTED HEAT PUMP

(71) Applicant: SOUTHEAST UNIVERSITY, Nanjing (CN)

(72) Inventors: Dongxu Wu, Nanjing (CN); Xiaosong Zhang, Nanjing (CN); Yuanzhi Gao, Nanjing (CN); Zhaofeng Dai, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/264,047

(22) PCT Filed: Jul. 1, 2022

(86) PCT No.: PCT/CN2022/103279
§ 371 (c)(1),
(2) Date: Aug. 2, 2023

(87) PCT Pub. No.: WO2023/284566
PCT Pub. Date: Jan. 19, 2023

(65) Prior Publication Data
US 2024/0083794 A1 Mar. 14, 2024

(30) Foreign Application Priority Data
Jul. 14, 2021 (CN) .......................... 202110793328.3

(51) Int. Cl.
*C02F 9/00* (2023.01)
*B01D 1/00* (2006.01)
(Continued)

(52) U.S. Cl.
CPC .............. *C02F 9/00* (2013.01); *B01D 1/0035* (2013.01); *B01D 3/007* (2013.01); *C02F 1/006* (2013.01);
(Continued)

(58) Field of Classification Search
None
See application file for complete search history.

(56) References Cited

U.S. PATENT DOCUMENTS

| | | | |
|---|---|---|---|
| 2003/0051367 A1* | 3/2003 | Griffin | F26B 21/06 165/59 |
| 2014/0166210 A1* | 6/2014 | Hudgens | B01D 1/18 159/3 |

(Continued)

FOREIGN PATENT DOCUMENTS

| | | |
|---|---|---|
| CN | 103466736 A | 12/2013 |
| CN | 104628063 A | 5/2015 |

(Continued)

OTHER PUBLICATIONS

Liu, Yanming, et al. "Development of Evaporation Treatment of High Salinity Wastewater in Coal Chemical," Environmental Engineering, Aug. 30, 2016, pp. 432-436, vol. 34.

*Primary Examiner* — Richard C Gurtowski
(74) *Attorney, Agent, or Firm* — MUNCY, GEISSLER, OLDS & LOWE, P.C.

(57) ABSTRACT

The present disclosure discloses a saline wastewater treatment system using solar-assisted heat pump. A method of solar thermal collector coupled with a heat pump can treat saline wastewater at low carbon and high efficiency, and industrial salt and fresh water can be obtained by concentration. The system includes a wastewater pretreatment system, a wastewater heating system, and a wastewater evaporation and concentration treatment system. The wastewater pretreatment system is connected to the wastewater (Continued)

heating system; and the wastewater heating system is connected to the wastewater evaporation and concentration treatment system.

4 Claims, 1 Drawing Sheet

(51) Int. Cl.
    *B01D 3/00*     (2006.01)
    *C02F 1/00*     (2023.01)
    *F24S 20/40*     (2018.01)
    *F24S 60/30*     (2018.01)
    *F24S 80/30*     (2018.01)
    *F25B 27/00*     (2006.01)
    *F25B 30/02*     (2006.01)
    *C02F 1/14*     (2023.01)
    *C02F 3/30*     (2023.01)

(52) U.S. Cl.
    CPC ............... *F24S 20/40* (2018.05); *F24S 60/30* (2018.05); *F24S 80/30* (2018.05); *F25B 27/005* (2013.01); *F25B 30/02* (2013.01); *C02F 1/004* (2013.01); *C02F 2001/007* (2013.01); *C02F 1/14* (2013.01); *C02F 3/301* (2013.01); *C02F 2201/005* (2013.01); *C02F 2303/10* (2013.01); *C02F 2303/16* (2013.01)

(56) References Cited

U.S. PATENT DOCUMENTS

2016/0368783 A1    12/2016    Ertel et al.
2023/0234870 A1*   7/2023    Liu ...................... C02F 1/5209
                                                        210/709

FOREIGN PATENT DOCUMENTS

| CN | 104925883 A | 9/2015 |
| --- | --- | --- |
| CN | 108147608 A | 6/2018 |
| CN | 108870522 A | 11/2018 |
| CN | 208916994 U | 5/2019 |
| CN | 112520804 A | 3/2021 |

* cited by examiner

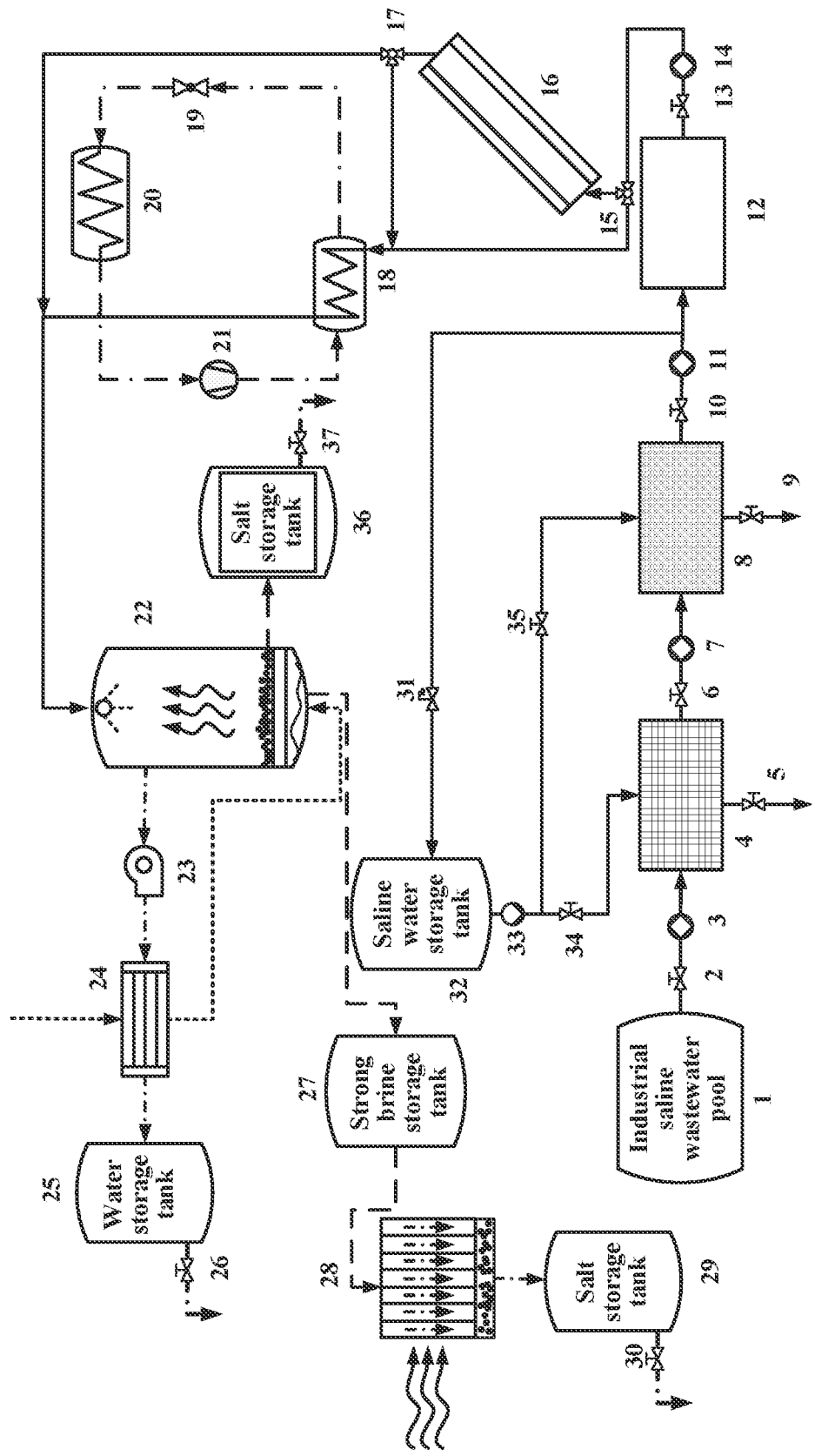

SALINE WASTEWATER TREATMENT SYSTEM USING SOLAR-ASSISTED HEAT PUMP

TECHNICAL FIELD

The present disclosure belongs to the field of treatment of saline wastewater, and in particular, relates to a saline wastewater treatment system using solar-assisted heat pump.

BACKGROUND

As more and more attentions are paid to environmental treatment in China, more and more attentions are paid to treatment of saline wastewater. The treatment of the saline wastewater has always been a key problem in sewage treatment. Because releasing salt at a high concentration into an environment can cause an increase in environmental osmotic pressure, thereby destroying microorganisms in the environment and also affecting aquatic organisms and polluting soil. Therefore, it is necessary to effectively treat the saline wastewater. At present, main technical solutions for the treatment of the saline wastewater include a multi-effect flash evaporation method and an electric drive membrane ED multi-stage purification technology. However, these traditional technologies all have the disadvantages of high energy consumption, high investment, high power consumption, and high operating and maintenance costs. Therefore, although the traditional methods have good effects of treating the saline wastewater, their costs are high, and it is difficult to promote these methods on a large scale.

SUMMARY

Technical problems: In order to solve the disadvantages of treatment of saline wastewater in the existing technology, the present disclosure provides a saline wastewater treatment system using solar-assisted heat pump. A method of combining a solar thermal collector with a coupled heat pump can treat saline wastewater at low carbon and high efficiency, and industrial salt and fresh water can be obtained by concentration.

Technical solutions: In order to solve the above problems, embodiments of the present disclosure provides a saline wastewater treatment system using solar-assisted heat pump, including a wastewater pretreatment system, a wastewater heating system, and a wastewater evaporation and concentration treatment system; the wastewater pretreatment system is connected to the wastewater heating system; and the wastewater heating system is connected to the wastewater evaporation and concentration treatment system.

Preferably, the wastewater pretreatment system includes an industrial wastewater pool, a natural settling pool, an activated carbon filter pool, a biodegradation pool, and a saline water storage tank; an outlet of the industrial wastewater pool is connected to an inlet of the natural settling pool through a first pipeline; an outlet of the natural settling pool is connected to an inlet of the activated carbon filter pool through a second pipeline; an outlet of the activated carbon filter pool is connected to an inlet of the biodegradation pool and an inlet of the saline water storage tank respectively through a first pipe group; an outlet of the saline water storage tank is connected to the inlet of the natural settling pool and the inlet of the activated carbon filter pool respectively through a second pipe group.

Preferably, a first valve and a first water pump are arranged in the first pipeline; a second valve and a second water pump are arranged in the second pipeline; the first pipe group includes a third pipeline and a fourth pipeline; the third pipeline is connected to the outlet of the activated carbon filter pool and the inlet of the biodegradation pool; one end of the fourth pipeline is communicated to the third pipeline, and the other end is communicated to the inlet of the saline water storage tank; a third valve and a third water pump are arranged in the third pipeline, and a fourth valve is arranged in the fourth pipeline; the second pipe group includes a fifth pipeline and a sixth pipeline; the fifth pipeline is connected to the outlet of the saline water storage tank and the inlet of the natural settling pool; one end of the sixth pipeline is connected to the fifth pipeline, and the other end is communicated to the inlet of the activated carbon filter pool; a fourth water pump and a fifth valve are arranged in the fifth pipeline; and a sixth valve is arranged in the sixth pipeline.

Preferably, a filter net, a barrier net, and an activated carbon layer which are used for performing multiple filtrations on saline wastewater are arranged in the activated carbon filter pool.

Preferably, the wastewater heating system includes a solar thermal collector and a heat pump system; the heat pump system includes a condenser, a throttle valve, an evaporator, and a compressor; an outlet of the compressor is connected to an inlet of the condenser; an outlet of the condenser is connected to an inlet of the throttle valve; an outlet of the throttle valve is connected to an inlet of the evaporator; an outlet of the evaporator is connected to an inlet of the compressor; an outlet of the biodegradation pool is connected to an inlet of the solar thermal collector and the inlet of the condenser respectively through a first three-way valve; an outlet of the solar thermal collector is connected to the inlet of the condenser and the wastewater evaporation and concentration treatment system respectively through a second three-way valve; and the outlet of the condenser is connected to the wastewater evaporation and concentration treatment system.

Preferably, a twelfth valve and a fifth water pump are arranged on a pipeline between the outlet of the biodegradation pool and the first three-way valve.

Preferably, the wastewater evaporation and concentration treatment system includes an evaporation and concentration chamber, a heat exchanger, a water storage tank, a strong brine storage tank, an evaporation wind screen, a first salt storage tank, and a second salt storage tank; where the outlet of the solar thermal collector is connected to the inlet of the condenser and a first inlet of the evaporation and concentration chamber respectively through the second three-way valve; the outlet of the condenser is connected to the first inlet of the evaporation and concentration chamber; a liquid outlet of the evaporation and concentration chamber is connected to an inlet of the strong brine storage tank; an outlet of the strong brine storage tank is connected to an inlet of the evaporation wind screen; an outlet of the evaporation wind screen is connected to an inlet of the first salt storage tank; a first outlet of the evaporation and concentration chamber is connected to a first inlet of the heat exchanger through a fan; a second outlet of the evaporation and concentration chamber is connected to an inlet of the second salt storage tank; a first outlet of the heat exchanger is connected to the water storage tank; a second inlet of the heat exchanger is communicated to the outside; and a second outlet of the heat exchanger is communicated to a second inlet of the evaporation and concentration chamber.

Preferably, the first inlet of the evaporation and concentration chamber is located at the top of the evaporation and concentration chamber.

Preferably the second inlet of the evaporation and concentration chamber is located at the bottom of the evaporation and concentration chamber.

Compared with the prior art, the present disclosure has the following advantages:

(1) Since the system of the present disclosure uses low-grade energy, the system has the advantage of more energy saving compared to a traditional saline wastewater treatment method. Waste heat of both solar energy and the condenser of the heat pump system are fully used, and the instability of the environment is also considered, so that a solar energy system and the heat pump system are effectively coupled. If the solar energy is insufficient, wastewater can enter the solar thermal collector for initial heating and then enter the heat pump system for further heat exchange, which increases the temperature. If the solar energy is relatively high, the wastewater can reach a relatively high temperature through the solar thermal collector, and can directly enter the wastewater evaporation and concentration treatment system, so that continuous operation of the system can be achieved.

(2) The system of the present disclosure can effectively use resources and achieve energy saving and environmental protection. Compared to a traditional saline wastewater treatment method, the system makes a full use of resources in industrial wastewater during the treatment of the saline wastewater. After treatment, fresh water and industrial salt can be obtained, achieving effective resource recycling and using.

(3) The system of the present disclosure uses an air drying technology for solution dehumidification. The saline wastewater is first preheated, and the wastewater entering the evaporation and concentration chamber is atomized and is sprayed down from the top, while external air heated by the heat exchanger is introduced from the bottom of the evaporation and concentration chamber. At this time, the high-temperature atomized droplets come into full contact with the air to achieve rapid evaporation and heat absorption. At the same time, salt in the droplets will be precipitated during the evaporation process. The present disclosure belongs to a novel saline wastewater treatment method.

BRIEF DESCRIPTION OF THE DRAWINGS

The FIGURE is a structural schematic diagram of an embodiment of the present disclosure.

In the drawings: industrial wastewater pool 1, first valve 2, first water pump 3, natural settling pool 4, seventh valve 5, second valve 6, second water pump 7, activated carbon filter pool 8, eighth valve 9, third valve 10, third water pump 11, biodegradation pool 12, twelfth valve 13, fifth water pump 14, first three-way valve 15, solar thermal collector 16, second three-way valve 17, condenser 18, throttle valve 19, evaporator 20, compressor 21, evaporation and concentration chamber 22, fan 23, heat exchanger 24, water storage tank 25, ninth valve 26, strong brine storage tank 27, evaporation wind screen 28, first salt storage tank 29, tenth valve 30, fourth valve 31, saline water storage tank 32, fourth water pump 33, fifth valve 34, sixth valve 35, second salt storage tank 36, and eleventh valve 37.

DETAILED DESCRIPTION

The technical solutions in the embodiments of the present disclosure will be described clearly and completely below in combination with the accompanying drawings in the embodiments of the present disclosure.

As shown in the FIGURE, a saline wastewater treatment system using solar-assisted heat pump according to the embodiments of the present disclosure includes a wastewater pretreatment system, a wastewater heating system, and a wastewater evaporation and concentration treatment system. The wastewater pretreatment system is connected to the wastewater heating system; and the wastewater heating system is connected to the wastewater evaporation and concentration treatment system.

In the above embodiment, the wastewater pretreatment system includes an industrial wastewater pool 1, a natural settling pool 4, an activated carbon filter pool 8, a biodegradation pool 12, and a saline water storage tank 32. An outlet of the industrial wastewater pool 1 is connected to an inlet of the natural settling pool 4 through a first pipeline. An outlet of the natural settling pool 4 is connected to an inlet of the activated carbon filter pool 8 through a second pipeline. An outlet of the activated carbon filter pool 8 is connected to an inlet of the biodegradation pool 12 and an inlet of the saline water storage tank 32 respectively through a first pipe group. An outlet of the saline water storage tank 32 is connected to the inlet of the natural settling pool 4 and the inlet of the activated carbon filter pool 8 respectively through a second pipe group. A seventh valve 5 is arranged at the bottom of the natural settling pool 4 and used for discharging wastewater that cleans the solid wastes in the natural settling pool, the cleaning water comes from the saline water storage tank. An eighth valve 9 used for discharging solid wastes and water that cleans the saline water storage tank to a wastewater outlet of the activated carbon filter pool is arranged at the bottom of the activated carbon filter pool 8.

Preferably, a first valve 2 and a first water pump 3 are arranged in the first pipeline; a second valve 6 and a second water pump 7 are arranged in the second pipeline; the first pipe group includes a third pipeline and a fourth pipeline; the third pipeline is connected to the outlet of the activated carbon filter pool 8 and the inlet of the biodegradation pool 12; one end of the fourth pipeline is communicated to the third pipeline, and the other end is communicated to the inlet of the saline water storage tank 32; a third valve 10 and a third water pump 11 are arranged in the third pipeline, and a fourth valve 31 is arranged in the fourth pipeline; the second pipe group includes a fifth pipeline and a sixth pipeline; the fifth pipeline is connected to the outlet of the saline water storage tank 32 and the inlet of the natural settling pool 4; one end of the sixth pipeline is connected to the fifth pipeline, and the other end is communicated to the inlet of the activated carbon filter pool 8; a fourth water pump 33 and a fifth valve 34 are arranged in the fifth pipeline; and a sixth valve 35 is arranged in the sixth pipeline.

A working process of the above wastewater pretreatment system is as follows: industrial saline wastewater is first introduced into the natural settling pool 4 from the industrial wastewater pool 1 via the first water pump 3. Some impurities in the wastewater are first filtered out by the gravity, and upper liquid in the natural settling pool 4 is then introduced into the activated carbon filter pool 8 by using the second water pump 7. In the activated carbon filter pool 8, the wastewater will be filtered through a filter net, a barrier net, activated carbon, and the saline wastewater is subjected to multiple filtrations, so as to remove suspended solids from the wastewater. The wastewater filtered by the activated carbon filter pool 8 is introduced into the biodegradation pool 12 through the third water pump 11 for anaerobic and oxygen-enriched treatment to remove microorganisms from the wastewater. At the same time, the wastewater in the activated carbon filter pool 8 is introduced into the saline water storage tank 32, and a water volume in the tank is ensured through the fourth valve 31. The water in the saline water storage tank 32 is used for cleaning the natural settling pool 4 and the activated carbon filter pool 8. The natural settling pool 4 and the activated carbon filter pool 8 are easily blocked because of many impurities therein. The fourth water pump 33, the fifth valve 34, and the sixth valve 35 are controlled to clean the natural settling pool 4 and the activated carbon filter pool 8.

In the above embodiment, the filter net, the barrier net, and an activated carbon layer which are used for performing multiple filtrations on the saline wastewater are arranged in the activated carbon filter pool 8. The filter net, the barrier net, and the activated carbon layer can all filter the saline wastewater.

Preferably, the wastewater heating system includes a solar thermal collector 16 and a heat pump system; the heat pump system includes a condenser 18, a throttle valve 19, an evaporator 20, and a compressor 21; an outlet of the compressor 21 is connected to an inlet of the condenser 18; an outlet of the condenser 18 is connected to an inlet of the throttle valve 19; an outlet of the throttle valve 19 is connected to an inlet of the evaporator 20; an outlet of the evaporator 20 is connected to an inlet of the compressor 21; an outlet of the biodegradation pool 12 is connected to an inlet of the solar thermal collector 16 and the inlet of the condenser 18 respectively through a first three-way valve 15; an outlet of the solar thermal collector 16 is connected to the inlet of the condenser 18 and the wastewater evaporation and concentration treatment system respectively through a second three-way valve 17; and the outlet of the condenser 18 is connected to the wastewater evaporation and concentration treatment system. Both the evaporator 20 and the condenser 18 are provided with a refrigerant inlet and a refrigerant outlet. The outlet of the compressor 21 is connected to the refrigerant inlet of the condenser 18, and at the same time, the condenser 18 is also provided with a wastewater inlet and a wastewater outlet.

Preferably, a twelfth valve 13 and a fifth water pump 14 are arranged on a pipeline between the outlet of the biodegradation pool 12 and the first three-way valve 15. By the arrangement of the twelfth valve 13 and the fifth water pump 14, the pipeline is controlled to be on and off.

A working process of the above wastewater heating system is as follows: the wastewater treated by the wastewater pretreatment system is heated by the solar coupled heat pump system. When there is abundant solar energy in the environment, the wastewater can reach a certain temperature after being heated by the solar thermal collector 16. At this time, the wastewater can be directly conveyed into the wastewater evaporation and concentration treatment system without further heating by the heat pump system. If there is insufficient solar energy in the environment, the wastewater heated by the solar thermal collector then exchanges heat through the condenser of the heat pump system. After reaching a relevant temperature, the wastewater is then conveyed into the wastewater evaporation and concentration treatment system to achieve rapid evaporation and concentration. The system couples the solar energy with the low-grade energy of a heat pump, which fully considers the uncertainty of the solar energy and can achieve continuous operation of the system.

A circulation process of the heat pump is completed by the condenser 18, the throttle valve 19, the evaporator 20, and the compressor 21. Both the condenser 18 and the evaporator 20 are provided with the refrigerant inlet and the refrigerant outlet. The outlet of the compressor 21 is connected to the refrigerant inlet of the condenser 18; the refrigerant outlet of the condenser 18 is connected to the inlet of the throttle valve 19; the outlet of throttle valve 19 is connected to the refrigerant inlet of the evaporator 20; and the refrigerant outlet of the evaporator 20 is connected to the inlet of the compressor 21. The condenser 18 is composed of a shell and an internal pipe. One end of the internal pipe of the condenser 18 is connected to an outlet of the first three-way valve 15 and an outlet of the second three-way valve 17, and the other end is connected to an inlet of an evaporation and concentration chamber. The refrigerant outlet of the shell of the condenser 18 is connected to the inlet of the throttle valve 19, and the refrigerant inlet of the shell is connected to the outlet of the compressor 21.

When there is sufficient solar radiation in the environment, a left valve of the first three-way valve 15 is closed, and a middle valve of the first three-way valve is opened. At this time, the wastewater from the outlet of the biodegradation pool 12 enters the solar thermal collector 16. If the wastewater at the outlet of the solar thermal collector 16 has a relatively high temperature, further heating is not required. At this time, a middle valve of the second three-way valve 17 is closed, and the wastewater enters the evaporation and concentration chamber 22. If the wastewater at the outlet of the solar thermal collector 16 needs to be further heated, at this time, a right valve of the second three-way valve 17 is closed, and the wastewater enters the condenser 18 of the heat pump system. If there is weak or no solar radiation in the environment, the middle valve of the first three-way valve 15 is closed. At this time, the wastewater from the outlet of the biodegradation pool 12 enters the condenser 18 of the heat pump system.

Preferably, the wastewater evaporation and concentration treatment system includes the evaporation and concentration chamber 22, a heat exchanger 24, a water storage tank 25, a strong brine storage tank 27, an evaporation wind screen 28, a first salt storage tank 29, and a second salt storage tank 36; where the outlet of the solar thermal collector 16 is connected to the inlet of the condenser 18 and a first inlet of the evaporation and concentration chamber 22 respectively through the second three-way valve 17; the outlet of the condenser 18 is connected to the first inlet of the evaporation and concentration chamber 22; a liquid outlet of the evaporation and concentration chamber 22 is connected to an inlet of the strong brine storage tank 27; an outlet of the strong brine storage tank 27 is connected to an inlet of the evaporation wind screen 28; an outlet of the evaporation wind screen 28 is connected to an inlet of the first salt storage tank 29; a first outlet of the evaporation and concentration chamber 22 is connected to a first inlet of the heat exchanger 24 through a fan 23; a second outlet of the evaporation and concentration chamber 22 is connected to an inlet of the second salt storage tank 36; a first outlet of the heat exchanger 24 is connected to the water storage tank 25; a second inlet of the heat exchanger 24 is communicated to the outside; and a second outlet of the heat exchanger 24 is communicated to a second inlet of the evaporation and concentration chamber 22.

Preferably, the first inlet of the evaporation and concentration chamber 22 is located at the top of the evaporation and concentration chamber 22. The second inlet of the evaporation and concentration chamber 22 is located at the bottom of the evaporation and concentration chamber 22. The saline wastewater is sprayed down from the first inlet, and the air heated by the heat exchanger 24 enters the evaporation and concentration chamber 22 from the second inlet. The sprayed liquid can be in full contact with the high-temperature air, thus accelerating the evaporation and concentration speed of the sprayed liquid. Furthermore, the evaporation of water can be fully achieved, and the yield of salt precipitation can be increased.

A working process of the above wastewater evaporation and concentration treatment system is as follows: the wastewater treated by the heating system has reached a certain temperature, and is first sprayed down from the top of the evaporation and concentration chamber 22 through atomization. Due to the relatively high temperature and small particle size of the wastewater at this time, the wastewater can achieve rapid energy exchange with the air for rapid evaporation. When a saturation concentration of salt is reached, the precipitation of salt can be displayed. After the salt is filtered through the filter net at the bottom of the evaporation and concentration chamber 22, industrial salt can be obtained. The industrial salt is communicated to the second salt storage tank 36 through a pipeline. The second salt storage tank 36 is used for collecting the industrial salt. An eleventh valve 37 is arranged outside the second salt storage tank 36 and is used for discharging the stored industrial salt. At the same time, there is air with relatively high temperature and humidity above the evaporation and concentration chamber 22, and the air is introduced into the heat exchanger 24 through the fan 23. External air enters the heat exchanger 24 and exchanges heat with the air with relatively high temperature and humidity discharged from the evaporation and concentration chamber 22, achieving efficient condensation of water. At this time, the air also has a temperature rise. The heated air is led into the bottom of the evaporation and concentration chamber 22 and blown into the evaporation and concentration chamber 22 to accelerate the evaporation and concentration of the wastewater. The heat exchanger 24 is composed of a shell and an internal pipe. An outlet of the fan 23 is connected to an inlet of the internal pipe of the heat exchanger 24. At this time, the high-temperature and high-humidity air from the evaporation and concentration chamber 22 enters the heat exchanger 24, and the external air enters the inlet of the shell. The temperature of the external air is relatively low, so the external air exchanges heat with the high-temperature and high-humidity air inside the pipe. The air inside the pipe will generate a large amount of fresh water due to condensation, and the external air will be heated to a certain temperature and conveyed into the evaporation and concentration chamber 22. The generated fresh water flows into the water storage tank 25. A ninth valve 26 is arranged on an outer side of the water storage tank 25. The ninth valve 26 is opened to make the water in the water storage tank 25 flow out. Some high-concentration saline wastewater is also generated at the bottom of the evaporation and concentration chamber 22, which is introduced into the strong brine storage tank 27 and then led to the evaporation wind screen 28. At this time, the external air is led into the evaporation wind screen 28. In the evaporation wind screen 28, the saline wastewater undergoes convective heat exchange with the air on a large area to achieve the evaporation of the water. At this time, a large amount of salt will be precipitated, to obtain a large amount of industrial salt, which is stored in the first salt storage tank 29. A tenth valve 30 is arranged on an outer wall of the first salt storage tank 29. The tenth valve 30 is controlled to be opened to discharge the industrial salt in the first salt storage tank 29.

In the system of this application, the saline wastewater is preliminarily treated by the natural settling pool 4, the activated carbon filter pool 8, and the biodegradation pool 12 to obtain saline wastewater free of solid particle impurities and bacteria. Then, the saline wastewater is heated by the solar thermal collector and a heat pump system to obtain high-temperature saline wastewater. Then, the fresh water and the industrial salt are obtained by spraying and evaporating the wastewater through an evaporative concentrator. The method of the present disclosure effectively uses a low-temperature heat source (the solar energy and the heat pump system), which can effectively increase the temperature of the wastewater and achieve rapid evaporation of water in a spraying chamber (namely, the evaporation and concentration chamber 22). The system of the embodiments of the present disclosure can efficiently use the low-temperature heat source to treat the saline wastewater, thereby obtaining the fresh water and the industrial salt. Not only can the problem of sewage treatment be solved, but also effective recycling and using of water resources and salt can be achieved, so that the system has good economic benefits.

It should be understood that the described embodiments are only a part of the embodiments of the present disclosure, rather than all of the embodiments. Based on the embodiments in the present disclosure, all other embodiments obtained by those skilled in the art without creative work shall fall within the scope of the protection of the present disclosure.

What is claimed is:

1. A saline wastewater treatment system using a solar-assisted heat pump, comprising a wastewater pretreatment system, a wastewater heating system, and a wastewater evaporation and concentration treatment system, wherein the wastewater pretreatment system is connected to the wastewater heating system; and the wastewater heating system is connected to the wastewater evaporation and concentration treatment system;

wherein the wastewater pretreatment system comprises an industrial wastewater pool, a natural settling pool, an activated carbon filter pool, a biodegradation pool, and a saline water storage tank; an outlet of the industrial wastewater pool is connected to an inlet of the natural settling pool through a first pipeline; an outlet of the natural settling pool is connected to an inlet of the activated carbon filter pool through a second pipeline; an outlet of the activated carbon filter pool is connected to an inlet of the biodegradation pool and an inlet of the saline water storage tank respectively through a first pipe group; and an outlet of the saline water storage tank is connected to the inlet of the natural settling pool and the inlet of the activated carbon filter pool respectively through a second pipe group;

wherein the wastewater heating system comprises a solar thermal collector and a heat pump system; the heat pump system comprises a condenser, a throttle valve, an evaporator, and a compressor; an outlet of the compressor is connected to an inlet of the condenser; an outlet of the condenser is connected to an inlet of the throttle valve; an outlet of the throttle valve is connected to an inlet of the evaporator; an outlet of the evaporator is connected to an inlet of the compressor; an outlet of the biodegradation pool is connected to an inlet of the solar thermal collector and the inlet of the condenser respectively through a first three-way valve;

an outlet of the solar thermal collector is connected to the inlet of the condenser and the wastewater evaporation and concentration treatment system respectively through a second three-way valve; and the outlet of the condenser is connected to the wastewater evaporation and concentration treatment system;

wherein the wastewater evaporation and concentration treatment system comprises an evaporation and concentration chamber, a heat exchanger, a water storage tank, a brine storage tank, an evaporation wind screen, a first salt storage tank, and a second salt storage tank, wherein the outlet of the solar thermal collector is connected to the inlet of the condenser and a first inlet of the evaporation and concentration chamber respectively through the second three-way valve; the outlet of the condenser is connected to the first inlet of the evaporation and concentration chamber;

a liquid outlet of the evaporation and concentration chamber is connected to an inlet of the brine storage tank; an outlet of the brine storage tank is connected to an inlet of the evaporation wind screen; an outlet of the evaporation wind screen is connected to an inlet of the first salt storage tank; a first outlet of the evaporation and concentration chamber is connected to a first inlet of the heat exchanger through a fan; a second outlet of the evaporation and concentration chamber is connected to an inlet of the second salt storage tank; a first outlet of the heat exchanger is connected to the water storage tank; a second inlet of the heat exchanger is communicated to the outside; and a second outlet of the heat exchanger is communicated to a second inlet of the evaporation and concentration chamber; wherein the first inlet of the evaporation and concentration chamber is located at a top of the evaporation and concentration chamber, wherein the second inlet of the evaporation and concentration chamber is located at a bottom of the evaporation and concentration chamber.

2. The saline wastewater treatment system using solar-assisted heat pump according to claim 1, wherein a first valve and a first water pump are arranged in the first pipeline; a second valve and a second water pump are arranged in the second pipeline; the first pipe group comprises a third pipeline and a fourth pipeline; the third pipeline is connected to the outlet of the activated carbon filter pool and the inlet of the biodegradation pool; one end of the fourth pipeline is communicated to the third pipeline, and the other end is communicated to the inlet of the saline water storage tank; a third valve and a third water pump are arranged in the third pipeline, and a fourth valve is arranged in the fourth pipeline; the second pipe group comprises a fifth pipeline and a sixth pipeline; the fifth pipeline is connected to the outlet of the saline water storage tank and the inlet of the natural settling pool; one end of the sixth pipeline is connected to the fifth pipeline, and the other end is communicated to the inlet of the activated carbon filter pool; a fourth water pump and a fifth valve are arranged in the fifth pipeline; and a sixth valve is arranged in the sixth pipeline.

3. The saline wastewater treatment system using solar-assisted heat pump according to claim 1, wherein a filter net, a barrier net, and an activated carbon layer are arranged in the activated carbon filter pool, each of the filter net, the barrier net and the activated carbon layer filters the saline wastewater.

4. The saline wastewater treatment system using solar-assisted heat pump according to claim 1, wherein the sixth valve and a fifth water pump are arranged on a pipeline between the outlet of the biodegradation pool and the first three-way valve.

* * * * *